United States Patent
Duquesne et al.

(10) Patent No.: US 11,932,203 B2
(45) Date of Patent: Mar. 19, 2024

(54) STEP WITH INTEGRATED WATER TANK FOR AGRICULTURAL VEHICLE

(71) Applicant: CNH Industrial America LLC, New Holland, PA (US)

(72) Inventors: Frank R. G. Duquesne, Zwevegm (BE); Stefaan Eeckeloo, Sint-Andries (BE); Wouter Van Den Bulcke, Ghent (BE)

(73) Assignee: CNH Industrial America LLC, New Holland, PA (US)

( * ) Notice: Subject to any disclaimer, the term of this patent is extended or adjusted under 35 U.S.C. 154(b) by 407 days.

(21) Appl. No.: 17/393,831

(22) Filed: Aug. 4, 2021

(65) Prior Publication Data
US 2023/0043466 A1    Feb. 9, 2023

(51) Int. Cl.
| | |
|---|---|
| B60R 3/00 | (2006.01) |
| B60R 11/00 | (2006.01) |
| B60R 15/00 | (2006.01) |
| B60S 1/66 | (2006.01) |

(52) U.S. Cl.
CPC .............. B60R 3/002 (2013.01); B60R 11/00 (2013.01); B60R 15/00 (2013.01); B60S 1/66 (2013.01); *B60R 2011/004* (2013.01); *B60Y 2200/22* (2013.01)

(58) Field of Classification Search
CPC ......... B60R 3/002; B60R 11/00; B60R 15/00; B60R 2011/004; B60R 3/02; B60S 1/66; B60Y 2200/22; A01D 41/1261
See application file for complete search history.

(56) References Cited

U.S. PATENT DOCUMENTS

| | | | | | |
|---|---|---|---|---|---|
| 1,411,378 | A | * | 4/1922 | Robison ................. | B60K 15/00 224/558 |
| 5,695,207 | A | * | 12/1997 | Mouterde ................. | B60R 3/02 280/163 |
| 8,827,038 | B2 | * | 9/2014 | Salzman .................... | B60R 3/02 182/98 |

(Continued)

FOREIGN PATENT DOCUMENTS

| | | | | |
|---|---|---|---|---|
| AU | 2010101034 A4 | | 10/2010 | |
| CN | 108081951 A | * | 5/2018 | ............. B60K 15/03 |

(Continued)

OTHER PUBLICATIONS

Translated KR-102099941-B1 (Year: 2023).*

(Continued)

*Primary Examiner* — James A Shriver, II
*Assistant Examiner* — Ian Bryce Shelton
(74) *Attorney, Agent, or Firm* — Peter K. Zacharias

(57) ABSTRACT

A agricultural vehicle includes a step assembly having a step and a tank that is movably mounted to the step. The step has a flat and horizontally oriented top side and an angled side extending from the top side. The tank is movably mounted to the step and is configured to move between a stowed position and a deployed position. In the stowed position of the tank, a first side of the tank is aligned with and parallel to the angled side to form a continuous angled surface. In the deployed position of the tank, a second side of the tank is aligned with and parallel to the top side to form a continuous horizontal step surface.

15 Claims, 3 Drawing Sheets

(56) References Cited

U.S. PATENT DOCUMENTS

| | | | |
|---|---|---|---|
| 9,622,642 B2 | 4/2017 | Braaten et al. | |
| 10,161,107 B2 * | 12/2018 | Namai | E02F 9/0833 |
| 2008/0169623 A1 * | 7/2008 | Donnellan | B60R 3/02 |
| | | | 280/166 |
| 2009/0107094 A1 | 4/2009 | Bich et al. | |
| 2012/0266981 A1 * | 10/2012 | Ringer | B62D 33/0617 |
| | | | 137/544 |
| 2012/0312825 A1 * | 12/2012 | Kennedy | B60R 3/02 |
| | | | 220/660 |
| 2013/0153055 A1 * | 6/2013 | Gaffoglio | B60R 3/002 |
| | | | 137/355 |
| 2014/0158465 A1 * | 6/2014 | Salzman | E06C 5/02 |
| | | | 182/127 |
| 2016/0244947 A1 * | 8/2016 | Holcomb | E02F 9/0891 |
| 2017/0190293 A1 * | 7/2017 | Koga | B60R 3/00 |
| 2018/0044886 A1 * | 2/2018 | Namai | E02F 9/0833 |
| 2019/0143902 A1 * | 5/2019 | Schwalbe | B60R 3/005 |
| | | | 182/113 |

FOREIGN PATENT DOCUMENTS

| | | | | |
|---|---|---|---|---|
| CN | 112373398 A | * | 2/2021 | B60K 15/067 |
| DE | 202004000432 U1 | * | 4/2004 | B60N 3/18 |
| DE | 102016105886 A1 | * | 10/2017 | |
| EP | 1686637 A1 | * | 8/2006 | B60R 16/04 |
| EP | 1990228 A1 | * | 11/2008 | B60K 15/03 |
| EP | 2826921 A1 | | 1/2015 | |
| EP | 2826921 A1 | * | 1/2015 | E02F 3/30 |
| EP | 2927098 A1 | * | 10/2015 | B60K 15/063 |
| EP | 2927098 A1 | | 10/2015 | |
| KR | 20100002835 U | * | 3/2010 | |
| KR | 20140080858 A | * | 7/2014 | |
| KR | 20140080858 A | | 7/2014 | |
| KR | 20170078191 A | * | 7/2017 | |
| KR | 10209994 B1 | | 4/2020 | |
| KR | 102099941 B1 | * | 4/2020 | |
| WO | WO-2013137169 A1 | * | 9/2013 | E02F 3/30 |
| WO | WO-2016167045 A1 | * | 10/2016 | B60K 13/04 |

OTHER PUBLICATIONS

Translated KR-20140080858-A (Year: 2023).*
International Search Report and Written Opinion for Application No. PCT/US2022/39246 dated Dec. 2, 2022 (11 pages).

* cited by examiner

STEP WITH INTEGRATED WATER TANK FOR AGRICULTURAL VEHICLE

FIELD OF THE INVENTION

The present invention relates to a step (i.e., foot step or step bar) for an agricultural vehicle having an integrated water tank and tool box.

BACKGROUND OF THE INVENTION

Agricultural vehicles, such as harvesters, forage harvesters, combine harvesters, sprayers, balers, etc., commonly include one or more steps on the side of the vehicle that are used by an operator for climbing into the cab of the vehicle. Described herein is a foot step having an integrated water tank and tool box and that is configured to limit dust, sediment, grain, etc, from accumulating on the surface of the step during a harvesting operation, for example.

SUMMARY OF THE INVENTION

According to one aspect of the invention, an agricultural vehicle includes a step assembly having a step and a tank that is movably mounted to the step. The step has a flat and horizontally oriented top side and an angled side extending from the top side. The tank is movably mounted to the step and is configured to move (e.g., rotated by 180 degrees) between a stowed position and a deployed position. In the stowed position of the tank, a first side of the tank is aligned with and parallel to the angled side to form a continuous angled surface. In the deployed position of the tank, a second side of the tank is aligned with and parallel to the top side to form a continuous horizontal step surface.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
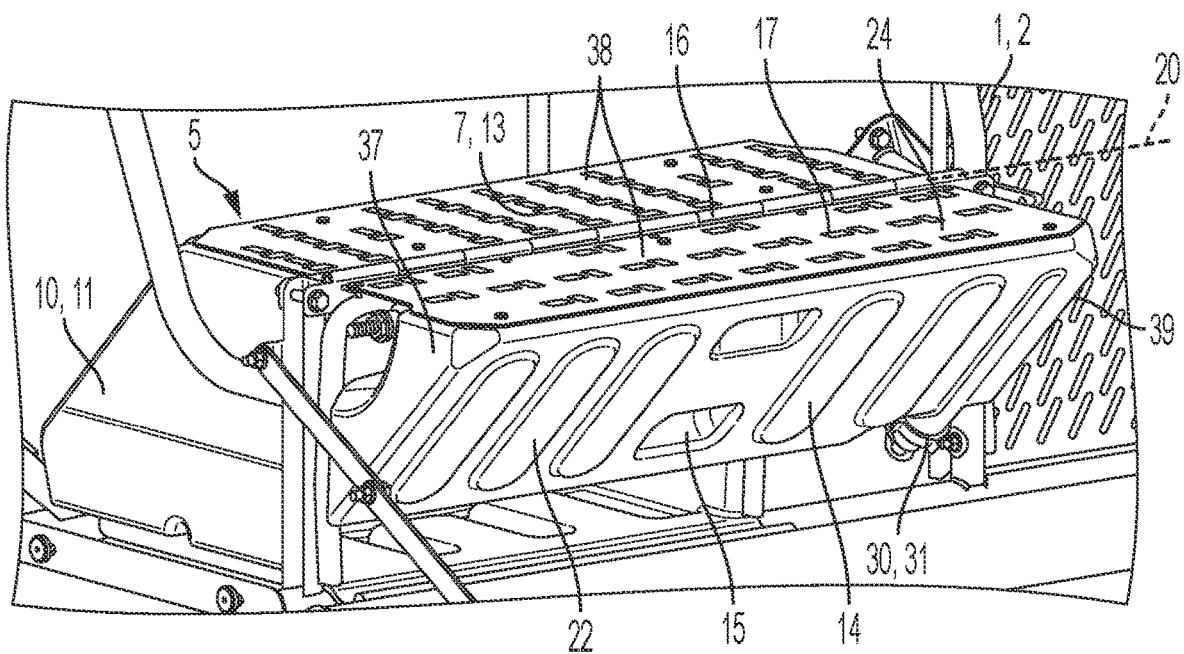
FIG. 1 is a rear isometric view of a step assembly shown rotated to a deployed state.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of agricultural vehicles, such as combine harvesters, are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Figure 5:
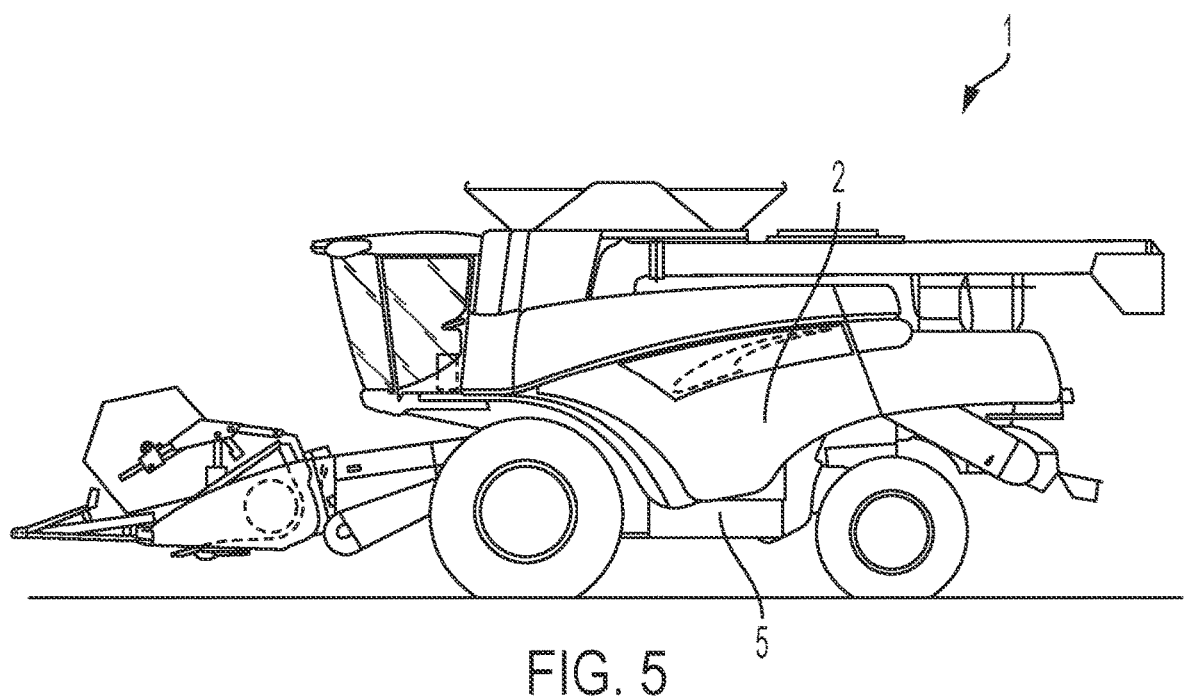
FIG. 5 depicts an agricultural vehicle, such as a combine harvester, including the step assembly.

Referring now to the drawings, agricultural vehicles, such as the agricultural vehicle shown in FIG. 5 (e.g., a harvester, forage harvester, combine harvester, sprayer, baler, and so forth) can include steps (which may be referred to as a step bars or foot steps) on the side of the vehicle that are used by an operator for climbing into the cab (or any other area) of the vehicle. Such steps are mounted to the body 2 of the vehicle 1. Further details of an agricultural vehicle in the form of a combine harvester 1 are described in U.S. Patent App. Pub. No. 2009/0107094, which is incorporated by reference herein in its entirety.

Figure 2:
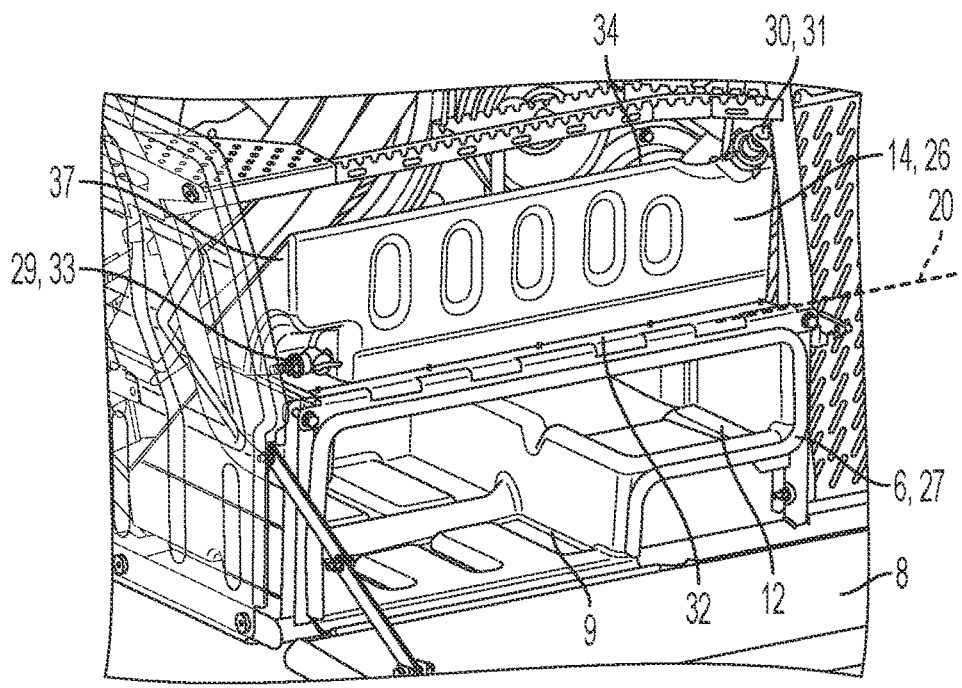
FIG. 2 is a rear isometric view of the step assembly shown rotated to a stowed state.
Figure 3:
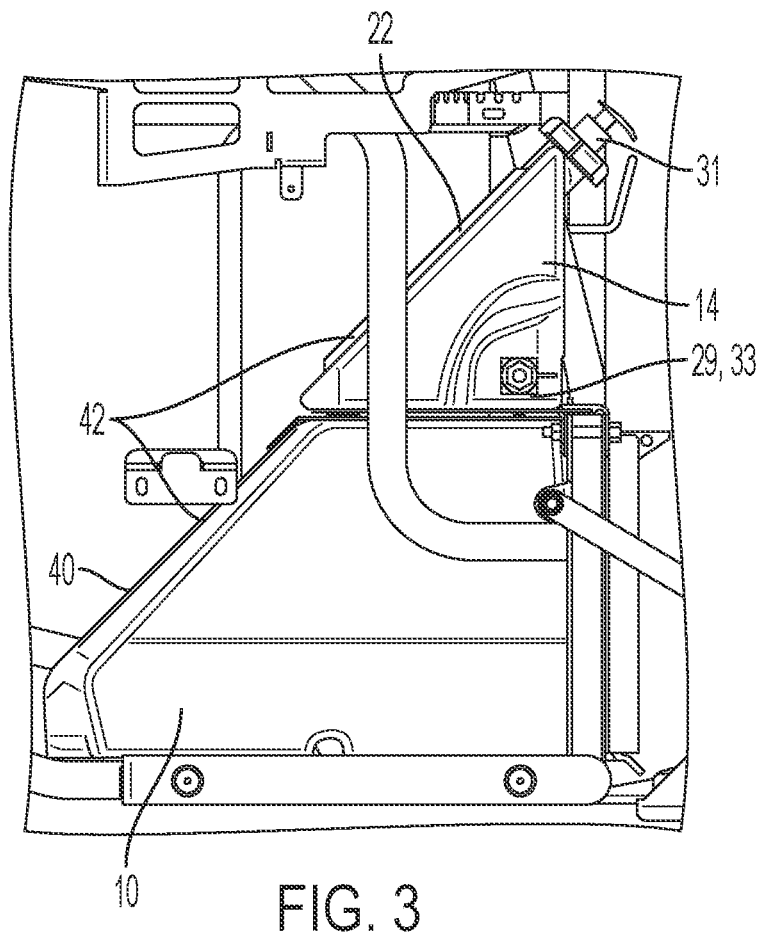
FIG. 3 is a side view of the step assembly of FIG. 2 in the stowed state.
Figure 4:
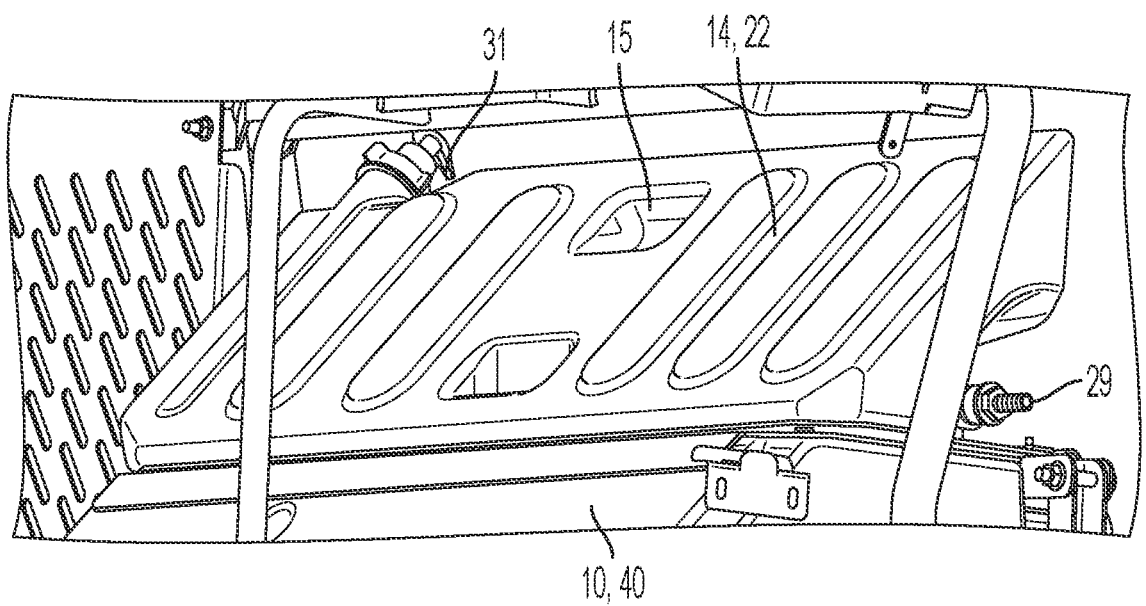
FIG. 4 is a front isometric view of the step assembly in the stowed state.

FIG. 1 depicts a rear isometric view of such a step assembly 5 mounted to the body 2 of vehicle 1. Step assembly 5 is shown rotated to a deployed state in FIG. 1, whereas FIGS. 2-4 depict step assembly 5 in a stowed state.

Step assembly 5 generally includes a step 10 and a water tank 14 that is movably mounted to the step 10. Turning now to the features of the step, step 10 comprises a multi-sided polygonal body 11 having one open side 9 and a hollow interior region 12 that can be used to store tools or other implements. Thus, the hollow interior region 12 of the step 10 can constitute a tool box or, more generally, a storage area. A hinged cover 8 is connected to the vehicle for selectively covering and concealing the open side 9 of step 10. Cover 8 is shown rotated to the open state in the figures. A seal 7 is positioned on the open face 6 of step 10 for sealing an interface between the cover 8 and the open face 6 of step 10 to either limit or prevent the ingress of foreign material (e.g., dust or water) into the hollow interior 12 when the moveable cover 8 is positioned against the open face 6 of step 10. Alternatively, seal 7 may be positioned on cover 8.

A first tread plate 13 is mounted to the flat and horizontally oriented top side 7 of the step 10 for enhanced foot traction, as is known in the art. A front facing angled side 40 extends obliquely from the top side 7.

Tank 14 comprises a right triangle shaped (or triangular prism shaped) hollow body that is connected to the top side 7 of step 10 by a hinge 16. Tank 14 may comprises a blow molded or an injection molded body, for example. Tank 14 is configured to be rotated about an axis 20 of hinge 16 between the deployed and stowed positions. The longitudinal axes of tank 14 and hinge 16 extend in the same direction.

Tank 14 includes a hollow region for holding a liquid, such as water, for example. By way of non-limiting example, tank 14 may contain 20 liters of liquid.

A first (hypotenuse) side 22 of tank 14 includes two depressions in the form of handles 15 for grasping by a user. Alternatively, handles may be separately connected to the side 22. A second side 24 of tank 14 includes a second tread plate 17. First and second tread plates 13 and 17 are separated by hinge 16. A third side 26 of tank 14 is substantially flat. Sides 22, 24 and 26 may be considered faces of the triangular prism, whereas opposing sides 37 and 39 may be considered bases of the triangular prism.

It is noted that side 22 may vary from that which is shown and described. For example, side 22 may have a concave or convex shape, and is not limited to being flat. Thus, the tank 14 may be substantially triangular. Alternatively, the shape of the tank 14 may vary from a triangular shape.

A drain valve 29 is mounted to an opening 33 formed in tank 14. Opening 33 may also be referred to herein as a drain port. In use, liquid is expelled from tank 14 at drain valve 29. Opening 33 is located in a depression formed on a base side 37 of tank 14 to prevent drain valve 29 from being inadvertently kicked or otherwise contacted by a user. Opening 33 is positioned on or adjacent the edge 32 of tank 14. Edge 32 is substantially aligned with and in close proximity to axis 20.

A fill port opening 30 is defined on edge 34 of tank 14. Fill port 30 is used for filling tank 14 with fluid. An optional soap dispenser 31 is connected to fill port opening 30. Soap dispenser 31 includes a small soap bottle that is positioned within the interior of the tank, and a pump dispenser portion that is positioned outside of the tank 14. It is noted that fill port opening 30 and drain valve opening 33 are positioned on opposite sides and corners of the third side 26 of tank 14.

In the deployed position of tank 14 shown in FIG. 1, the second side 24 of tank 14 is positioned parallel to and planar with the top side of the step 10, such that the planar sides of tank 14 and step 10 together form a sufficiently deep and continuous horizontal step surface 38 for use by an operator of the vehicle. During a harvesting operation of the vehicle, for example, a significant amount of dust and debris can accumulate on the horizontal step surface 38. For that reason, tank 14 is capable of being pivoted about axis 20 to the stowed position in FIGS. 2-4 during a harvesting operation, for example.

In the stowed position of tank 14 shown in FIG. 2-4, the first (hypotenuse) side 22 of tank 14 is aligned with the front facing angled side 40 of step 10. Sides 22 and 40 together form a continuous angled or oblique surface 42. It should be understood that dust and debris are less likely to accumulate on oblique surface 42 (as compared with horizontal surface 38) due to the forces of gravity which urge the dust in the downward direction along surface 42 and onto the ground. Also, in the stowed position of tank 14, drain port 29 is positioned at (or near) the lowest point of tank 14 to enable the delivery of liquid from the interior of tank 14 under gravity.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle comprising a step assembly, said step assembly comprising:
   a step having a flat and horizontally-oriented top side and an angled side extending obliquely from said top side, said step being fixedly mounted to a body of the agricultural vehicle; and
   a tank that is movably mounted to said step and is configured to move between a stowed position and a deployed position, wherein, in the stowed position of the tank, a first side of the tank is aligned with and parallel to said angled side to form a continuous angled surface, and, in the deployed position of the tank, a second side of the tank is aligned with and parallel to said top side to form a continuous horizontal step surface.

2. The agricultural vehicle of claim 1 further comprising a hinge connecting the tank to the step, wherein the hinge is mounted to the top side of the step and the second side of the tank.

3. The agricultural vehicle of claim 1, wherein the tank has a hollow interior region for storing liquid.

4. The agricultural vehicle of claim 3, wherein the tank further comprises a drain port and a fill port.

5. The agricultural vehicle of claim 4, wherein, in the stowed position of the tank, the drain port is positioned at an elevation below the fill port.

6. The agricultural vehicle of claim 5, wherein, in the deployed position of the tank, the drain port is positioned at an elevation above the fill port.

7. The agricultural vehicle of claim 4 further comprising a liquid dispenser mounted to the fill port.

8. The agricultural vehicle of claim 1 further comprising a first foot tread connected to the top side of the step, and a second foot tread connected to the second side of the tank.

9. The agricultural vehicle of claim 1 further comprising a handle either attached to or formed on the first side of the tank.

10. The agricultural vehicle of claim 1, wherein the tank is in the shape of a triangular prism having three faces and two opposing base sides, and wherein the first and second sides of the tank represent two of the three faces of the triangular prism.

11. The agricultural vehicle of claim 1, wherein the step has a hollow interior and an open side, and the hollow interior is configured to be used as a storage space.

12. The agricultural vehicle of claim 11 further comprising a movable cover that is configured to be positioned against the step to conceal the hollow interior, wherein either the cover or the step includes a seal for sealing an interface between the moveable cover and the step to either limit or prevent the ingress of foreign material into the hollow interior when the moveable cover is positioned against the step.

13. The agricultural vehicle of claim 1, wherein, in the deployed position of the tank, the first side of the tank is not aligned with said angled side of the step.

14. The agricultural vehicle of claim 1, wherein, in the stowed position of the tank, the second side of the tank is positioned over top of, and in contact with, the top side of the step.

15. The agricultural vehicle of claim 1, wherein the agricultural vehicle is one of a harvester, forage harvester, combine harvester, sprayer, and baler.

* * * * *